United States Patent
Higuchi

(10) Patent No.: US 7,273,425 B2
(45) Date of Patent: Sep. 25, 2007

(54) SOLID GOLF BALL

(75) Inventor: Hiroshi Higuchi, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 11/293,226

(22) Filed: Dec. 5, 2005

(65) Prior Publication Data
US 2007/0129174 A1  Jun. 7, 2007

(51) Int. Cl.
A63B 37/06 (2006.01)
(52) U.S. Cl. .................................... 473/377
(58) Field of Classification Search ............. 473/378, 473/373, 374, 368, 377
See application file for complete search history.

(56) References Cited

U.S. PATENT DOCUMENTS

| | | | |
|---|---|---|---|
| 4,570,937 A * | 2/1986 | Yamada | 473/377 |
| 5,516,110 A * | 5/1996 | Yabuki et al. | 473/372 |
| 5,752,889 A | 5/1998 | Yamagishi et al. | |
| 5,848,943 A | 12/1998 | Sano et al. | |
| 5,929,189 A | 7/1999 | Ichikawa et al. | |
| 6,277,924 B1 | 8/2001 | Hamada et al. | |
| 6,302,810 B2 * | 10/2001 | Yokota | 473/377 |
| 6,520,872 B2 * | 2/2003 | Endo et al. | 473/374 |
| 6,533,683 B2 * | 3/2003 | Watanabe | 473/374 |
| 6,537,158 B2 * | 3/2003 | Watanabe | 473/374 |
| 6,642,314 B2 | 11/2003 | Sone et al. | |
| 6,786,836 B2 | 9/2004 | Higuchi et al. | |
| 6,837,804 B2 | 1/2005 | Watanabe et al. | |
| 6,887,168 B2 | 5/2005 | Hayashi et al. | |
| 2003/0144085 A1 | 7/2003 | Sasaki et al. | |
| 2003/0144425 A1* | 7/2003 | Mano et al. | 525/261 |
| 2004/0029650 A1* | 2/2004 | Higuchi et al. | 473/371 |
| 2004/0147694 A1 | 7/2004 | Sone et al. | |

FOREIGN PATENT DOCUMENTS

| | | |
|---|---|---|
| JP | 6-098949 A | 4/1994 |
| JP | 7-268132 A | 10/1995 |
| JP | 9-215778 A | 8/1997 |
| JP | 9-271538 A | 10/1997 |
| JP | 9-308708 A | 12/1997 |
| JP | 11-035633 A | 2/1999 |
| JP | 2002-293996 A | 10/2002 |
| JP | 2002-355338 A | 12/2002 |
| JP | 2003-70936 A | 3/2003 |
| JP | 2003-180879 A | 7/2003 |
| JP | 2004-180793 A | 7/2004 |

OTHER PUBLICATIONS

"Hydrolysis of Tri-tert-butylaluminum" by Mason et al., J. American Chemical Society, vol. 115, pp. 4971-4984 (1993).
"Three-Coordinate Aluminum Is Not a Prerequisite for Catalytic Activity in the Zirconocene-Alumoxane Polymerization of Ethylene", by Harlen et al, J. American Chemical Society, vol. 117, pp. 6465-6474, (1995).
"Report of Research & Development", Fine Chemical, vol. 23, No. 9, p. 5-15 (1994).

* cited by examiner

Primary Examiner—Raeann Trimiew
(74) Attorney, Agent, or Firm—Sughrue Mion Pllc.

(57) ABSTRACT

The invention provides a solid golf ball having a solid core, a cover layer that encloses the core, and a plurality of dimples formed on an outside surface of an outermost layer of the cover. The solid core is formed of a rubber composition composed of 100 parts by weight of a base rubber that includes 60 to 100 parts by weight of a polybutadiene rubber having a cis-1,4 bond content of at least 60% and synthesized using a rare-earth catalyst, 0.1 to 5 parts by weight of an organosulfur compound, and an unsaturated carboxylic acid or a metal salt thereof, an organic peroxide and an inorganic filler. The solid core has a deformation, when subjected to loading from an initial load of 10 kgf to a final load of 130 kg, of 2.0 to 3.5 mm, and has a specific hardness distribution. The cover layer, which is formed primarily of a thermoplastic or thermoset polyurethane material and has a thickness of 0.5 to 2.5 mm, a Shore D hardness at the surface of 50 to 70 and a flexural rigidity of 50 to 300 MPa. The core has a surface hardness which is from 1 to 15 Shore D hardness units lower than the surface hardness of the core. The golf ball has a deformation, when subjected to loading from an initial load of 10 kgf to a final load of 130 kgf, of 2.0 to 2.9 mm. The solid golf ball is advantageous overall in competitive use.

7 Claims, No Drawings

SOLID GOLF BALL

The present invention relates to a solid golf ball having a solid core and a cover layer which encloses the core. More particularly, the invention relates to a solid golf ball which is conferred with a high rebound on full shots with a driver so as to increase carry, which also has a good performance on approach shots and a good feel on impact, and which moreover has an excellent scuff resistance.

Golf balls designed to satisfy the overall characteristics desired in a golf ball, such as good flight properties, feel on impact and controllability on approach shots, have hitherto been improved in various ways. One example is the golf ball described in JP-A 6-98949.

However, because this golf ball has a hard cover, there are problems with its spin performance.

In addition, JP-A 9-308708, JP-A 2003-70936 and JP-A 2003-180879, for example, disclose solid golf balls in which the feel and controllability have been improved without a loss of rebound or cut resistance by setting the thickness, flexural rigidity and Shore D hardness of the cover within specific ranges.

Yet, because this golf ball has an inadequate core resilience and the core hardness distribution has not been optimized, properties such as the carry and the spin performance leave something to be desired.

JP-A 9-215778 and JP-A 9-271538 disclose solid golf balls in which a polyurethane material is used as the cover material. However, in these golf balls, the core lacks an adequate resilience and the resin from which the cover is formed has an inadequate scuff resistance. Hence, there remains room for improvement in the carry of the ball and the scuff resistance of the cover.

The golf balls described in JP-A 2002-355338 and JP-A 2004-180793 do have a good core resilience, but because these balls have a large deflection hardness and are soft, the rebound by the ball decreases, resulting in a less that satisfactory carry.

It is thus an object of the present invention to provide a solid golf ball which is conferred with a high rebound on full shots with a driver so as to increase carry, which has a good spin performance on approach shots and a good feel on impact, and which moreover has an excellent scuff resistance.

SUMMARY OF THE INVENTION

We have conducted extensive investigations in order to achieve the above object. As a result, we have found that by optimizing primarily the hardness distribution in the solid core and optimizing the relationship between the cover surface and core surface hardnesses, there can be obtained a solid golf ball having an excellent spin performance on approach shots, an improved carry on full shots due to a lower spin, and a good feel on impact. Moreover, compared with conventional cover layers made of materials such as ionomer resins, this solid golf ball has a low flexural rigidity for the hardness of the cover layer, which affords the ball an excellent spin performance and stability thereof. In addition, this solid golf ball has an excellent scuff resistance and excellent durability to cracking with repeated impact. Based on these findings, the solid golf ball of the invention has the following solid core I and cover layer II.

I. Solid Core
(i) The solid core is formed of a rubber composition composed of 100 parts by weight of a base rubber that includes 60 to 100 parts by weight of a polybutadiene rubber having a cis-1,4 bond content of at least 60% and synthesized using a rare-earth catalyst, 0.1 to 5 parts by weight of an organosulfur compound, and an unsaturated carboxylic acid or a metal salt thereof, an organic peroxide, and an inorganic filler.
(ii) The solid core has a deformation, when subjected to loading from an initial load of 10 kgf to a final load of 130 kg, of 2.0 to 3.5 mm.
(iii) The solid core has the hardness distribution shown in the table below.

TABLE 1

| Hardness Distribution in Solid Core | Shore D hardness |
|---|---|
| Center | 35 to 55 |
| Region located 5 to 10 mm from center | 39 to 58 |
| Region located 15 mm from center | 48 to 66 |
| Surface | 50 to 68 |
| Hardness difference between center and surface | 5 to 20 |

II. Cover Layer
(i) The cover layer is formed primarily of a thermoplastic or thermoset polyurethane material.
(ii) The cover layer has a thickness of 0.5 to 2.5 mm, a Shore D hardness at the surface of 50 to 70 and a flexural rigidity of 50 to 300 MPa; and the surface hardness of the core is from 1 to 15 Shore D hardness units lower than the surface hardness of the cover.

Accordingly, the invention provides the following solid golf balls.

[1] A solid golf ball having a solid core, a cover layer that encloses the core, and a plurality of dimples formed on an outside surface of an outermost layer of the cover, the solid golf ball being characterized in that the solid core is formed of a rubber composition composed of 100 parts by weight of a base rubber that includes 60 to 100 parts by weight of a polybutadiene rubber having a cis-1,4 bond content of at least 60% and synthesized using a rare-earth catalyst, 0.1 to 5 parts by weight of an organosulfur compound, and an unsaturated carboxylic acid or a metal salt thereof, an organic peroxide and an inorganic filler; the solid core has a deformation, when subjected to loading from an initial load of 10 kgf to a final load of 130 kg, of 2.0 to 3.5 mm, and has the hardness distribution shown in Table 1 above; the cover layer is formed primarily of a thermoplastic or thermoset polyurethane material and has a thickness of 0.5 to 2.5 mm, a Shore D hardness at the surface of 50 to 70 and a flexural rigidity of 50 to 300 MPa; the surface hardness of the core is from 1 to 15 Shore D hardness units lower than the surface hardness of the cover; and the golf ball has a deformation, when subjected to loading from an initial load of 10 kgf to a final load of 130 kgf, of 2.0 to 2.9 mm.

[2] The solid golf ball of [1] above, wherein the solid core has a diameter of 37.6 to 43.0 mm and the golf ball has a diameter of 42.67 to 44.0 mm.

[3] The solid golf ball of [1] above, wherein the solid core contains, per 100 parts by weight of the base rubber: 30 to 45 parts by weight of the unsaturated carboxylic acid or a metal salt thereof, 0.1 to 0.5 part by weight of the organic peroxide, 5 to 80 parts by weight of the inorganic filler, and 0 to 0.2 part by weight of an antioxidant.

[4] The solid golf ball of [1] above which has a hardness difference between any two places in the region of the solid core located 5 to 10 mm from the center of not more than ±2 Shore D hardness units.

[5] The solid golf ball of [1] above, wherein the dimples total in number from 250 to 450, have an average depth of 0.125 to 0.170 mm and an average diameter of 3.5 to 5.0 mm for all dimples, and are configured from at least four dimple types.

DETAILED DESCRIPTION OF THE INVENTION

The invention is described more fully below. The solid golf ball according to the invention has a solid core and a cover of one or more layers which encloses the solid core.

The solid core is a hot-molded material made of a rubber composition in which polybutadiene serves as the base rubber.

The polybutadiene must have a cis-1,4 bond content of at least 60%, preferably at least 80%, more preferably at least 90%, and most preferably at least 95%; and a 1,2-vinyl bond content of generally 2% or less, preferably 1.7% or less, even more preferably 1.5% or less, and most preferably 1.3% or less. Outside of this range, the rebound decreases.

It is recommended that the polybutadiene have a Mooney viscosity ($ML_{1+4}$ (100° C.)) of at least 30, preferably at least 35, more preferably at least 40, even more preferably at least 50, and most preferably at least 52, but preferably not more than 100, more preferably not more than 80, even more preferably not more than 70, and most preferably not more than 60.

The term "Mooney viscosity" used herein refers in each instance to an industrial indicator of viscosity (JIS K6300) as measured with a Mooney viscometer, which is a type of rotary plastometer. The unit symbol is $ML_{1+4}$ (100° C.), where "M" stands for Mooney viscosity, "L" stands for large rotor (L-type), "1+4" stands for a pre-heating time of 1 minute and a rotor rotation time of 4 minutes, and the "100° C." indicates that measurement was carried out at a temperature of 100° C.

The polybutadiene has a polydispersity index Mw/Mn (where Mw is the weight-average molecular weight, and Mn is the number-average molecular weight) of generally at least 2.0, preferably at least 2.2, more preferably at least 2.4, and even more preferably at least 2.6, but generally not more than 6.0, preferably not more than 5.0, more preferably not more than 4.0, and even more preferably not more than 3.4. A polydispersity Mw/Mn which is too small may lower the workability, whereas one that is too large may lower the rebound.

The polybutadiene is one that is synthesized with a rare-earth catalyst. A known rare-earth catalyst may be used for this purpose.

Exemplary rare-earth catalysts include those made up of a combination of a lanthanide series rare-earth compound, an organoaluminum compound, an alumoxane, a halogen-bearing compound and an optional Lewis base.

Examples of suitable lanthanide series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently a hydrogen or a hydrocarbon group of 1 to 8 carbons).

Preferred alumoxanes include compounds of the structures shown in formulas (I) and (II) below. The alumoxane association complexes described in Fine Chemical 23, No. 9, 5 (1994), J. Am. Chem. Soc. 115, 4971 (1993), and J. Am. Chem. Soc. 117, 6465 (1995) are also acceptable.

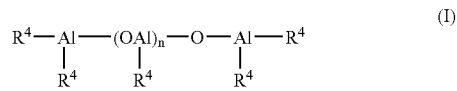

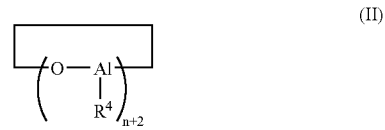

In the above formulas, $R^4$ is a hydrocarbon group having 1 to 20 carbon atoms, and n is 2 or a larger integer.

Examples of halogen-bearing compounds that may be used include aluminum halides of the formula $AlX_nR_{3-n}$ (wherein X is a halogen; R is a hydrocarbon group of 1 to 20 carbons, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$; and other metal halides such as silicon tetrachloride, tin tetrachloride and titanium tetrachloride.

The Lewis base can be used to form a complex with the lanthanide series rare-earth compound. Illustrative examples include acetylacetone and ketone alcohols.

In the practice of the invention, the use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Preferred examples of such rare-earth catalysts include those mentioned in JP-A 11-35633.

The polymerization of butadiene in the presence of a rare-earth catalyst may be carried out by bulk polymerization or vapor phase polymerization, either with or without the use of solvent, and at a polymerization temperature in a range of generally −30 to +150° C., and preferably 10 to 100° C.

The polybutadiene may be a modified polybutadiene obtained by polymerization using the above-described rare-earth catalyst, followed by the reaction of a terminal modifier with active end groups on the polymer.

A known terminal modifier may be used for this purpose. Illustrative examples include compounds of types (1) to (7) below.

(1) The modified polybutadiene can be obtained by reacting an alkoxysilyl group-bearing compound with active end groups on the polymer. Preferred alkoxysilyl group-bearing compounds are alkoxysilane compounds having at least one epoxy group or isocyanate group on the molecule. Specific examples include epoxy group-bearing alkoxysilanes such as 3-glycidyloxypropyltrimethoxysilane, 3-glycidyloxypropyltriethoxysilane, (3-glycidyloxypropyl)methyldimethoxysilane, (3-glycidyloxypropyl)methyldiethoxysilane, β-(3,4-epoxycyclohexyl)trimethoxysilane, β-(3,4-epoxycyclohexyl)triethoxysilane, β-(3,4-epoxycyclohexyl)methyldimethoxysilane, β-(3,4-epoxycyclohexyl)ethyldimethoxysilane, condensation products of 3-glycidyloxypropyltrimethoxysilane, and condensation products of (3-glycidyloxypropyl)methyl-dimethoxysilane; and isocyanate group-bearing alkoxysilane compounds such as 3-isocyanatopropyltrimethoxysilane, 3-isocyanatopropyltriethoxysilane, (3-isocyanatopropyl)methyldimethoxysilane, (3-isocyanatopropyl)methyldiethoxysilane, condensation products of 3-isocyanatopropyltrimethoxysilane and condensation products of (3-isocyanatopropyl)methyl-dimethoxysilane.

A Lewis acid can be added to accelerate the reaction when the above alkoxysilyl group-bearing compound is reacted with active end groups. The Lewis acid acts as a catalyst to promote the coupling reaction, thus improving cold flow by the modified polymer and providing a better shelf stability. Examples of suitable Lewis acids include dialkyltin dialkyl malates, dialkyltin dicarboxylates and aluminum trialkoxides.

Other types of terminal modifiers that may be used include:

(2) halogenated organometallic compounds, halogenated metallic compounds and organometallic compounds of the general formulas $R^5{}_nM'X_{4-n}$, $M'X_4$, $M'X_3$, $R^5{}_nM'(-R^6-COOR^7)_{4-n}$ or $R^5{}_nM'(-R^6-COR^7)_{4-n}$ (wherein $R^5$ and $R^6$ are each independently a hydrocarbon group of 1 to 20 carbons; $R^7$ is a hydrocarbon group of 1 to 20 carbons which may contain pendant carbonyl or ester groups; M' is a tin, silicon, germanium or phosphorus atom; X is a halogen atom; and n is an integer from 0 to 3);

(3) heterocumulene compounds having on the molecule a Y=C=Z linkage (wherein Y is a carbon, oxygen, nitrogen or sulfur atom; and Z is an oxygen, nitrogen or sulfur atom);

(4) three-membered heterocyclic compounds containing on the molecule the following bonds

(wherein Y is an oxygen, nitrogen or sulfur atom);

(5) halogenated isocyano compounds;

(6) carboxylic acids, acid halides, ester compounds, carbonate compounds and acid anhydrides of the formula $R^8-(COOH)_m$, $R^9(COX)_m$, $R^{10}-OCOO-R^{11}$), $R^{12}-OCOO-R^{13}$, $R^{14}-(COOCO-R^{15})_m$ or

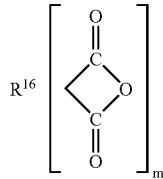

(wherein $R^8$ to $R^{16}$ are each independently a hydrocarbon group of 1 to 50 carbons, X is a halogen atom, and m is an integer from 1 to 5); and (7) carboxylic acid metal salts of the formula $R^{17}{}_1M''(OCOR^{18})_{4-1}$, $R^{19}{}_1M''(OCO-R^{20}-COOR^{21})_{4-1}$ or

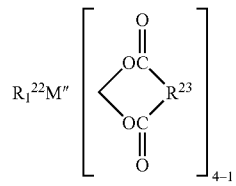

(wherein $R^{17}$ to $R^{23}$ are each independently a hydrocarbon group of 1 to 20 carbons, M'' is a tin, silicon or germanium atom, and the letter 1 is an integer from 0 to 3).

Specific examples of the above terminal modifiers (1) to (7) and methods for their reaction are described in, for example, JP-A 11-35633, JP-A 7-268132 and JP-A 2002-293996.

It is critical for the above-described polybutadiene to be included within the base rubber in an amount of at least 60 wt %, preferably at least 70 wt %, more preferably at least 80 wt %, and most preferably at least 90 wt %, and up to 100 wt %, preferably up to 98 wt %, and more preferably up to 95 wt %. If the amount of the above polybutadiene included is too small, a golf ball endowed with a good rebound will be difficult to obtain.

Rubbers other than the above polybutadiene may also be used and included, insofar as the objects of the invention are attainable. Specific examples include polybutadiene rubbers (BR), styrene-butadiene rubbers (SBR), natural rubbers, polyisoprene rubbers and ethylene-propylene-diene rubbers (EPDM). These may be used individually or as combinations of two or more thereof.

The hot-molded material serving as the solid core is molded from a rubber composition which includes as essential components specific amounts of an unsaturated carboxylic acid and/or a metal salt thereof, an organosulfur compound, an inorganic filler and an organic peroxide per 100 parts by weight of the above-described base rubber.

Specific examples of the unsaturated carboxylic acid include acrylic acid, methacrylic acid, maleic acid and fumaric acid. Acrylic acid and methacrylic acid are especially preferred.

Illustrative examples of the metal salt of the unsaturated carboxylic acid include the zinc and magnesium salts of unsaturated fatty acids such as zinc methacrylate and zinc acrylate. The use of zinc acrylate is especially preferred.

The above unsaturated carboxylic acid and/or metal salt thereof are included in an amount per 100 parts by weight of the base rubber of at least 30 parts by weight, preferably at least 31 parts by weight, and more preferably at least 32 parts by weight, but not more than 45 parts by weight, preferably not more than 43 parts by weight, even more preferably not more than 41 parts by weight, and most preferably not more than 39 parts by weight. Too much unsaturated carboxylic acid component will make the core too hard, giving the golf ball an unpleasant feel on impact. On the other hand, too little will result in a lower rebound.

The organosulfur compound is an essential ingredient for imparting a good rebound. Specifically, it is recommended that a thiophenol, thionaphthol or halogenated thiophenol, or a metal salt thereof, be included. Specific examples include pentachlorothiophenol, pentafluorothiophenol, pentabromothiophenol, p-chlorothiophenol, the zinc salt of pentachlorothiophenol; and diphenylpolysulfides, dibenzylpolysulfides, dibenzoylpolysulfides, dibenzothiazoylpolysulfides and dithiobenzoylpolysulfides having 2 to 4 sulfurs. Diphenyldisulfide and the zinc salt of pentachlorothiophenol are especially preferred.

The amount of the organosulfur compound included per 100 parts by weight of the base rubber is at least 0.1 part by weight, preferably at least 0.2 part by weight, more preferably at least 0.3 part by weight, and most preferably at least 0.4 part by weight, but not more than 5 parts by weight, preferably not more than 4 parts by weight, more preferably not more than 3 parts by weight, and most preferably not more than 2 parts by weight. Too much organosulfur compound makes the core too soft, whereas too little makes an improvement in rebound unlikely.

Illustrative examples of the inert filler include zinc oxide, barium sulfate and calcium carbonate. The amount included per 100 parts by weight of the base rubber is generally at least 5 parts by weight, preferably at least 6 parts by weight, even more preferably at least 7 parts by weight, and most preferably at least 8 parts by weight, but generally not more than 80 parts by weight, preferably not more than 60 parts by weight, more preferably not more than 40 parts by weight, and most preferably not more than 20 parts by weight. Too much or too little inorganic filler will make it impossible to obtain a proper golf ball weight and a suitable rebound.

The organic peroxide may be a commercially available product, suitable examples of which include Percumyl D (produced by NOF Corporation), Perhexa 3M (NOF Corporation), Perhexa C (NOF Corporation), and Luperco 231 XL (Atochem CO.) If, necessary, a combination of two or more different organic peroxides may be used.

The amount of organic peroxide per 100 parts by weight of the base rubber is generally at least 0.1 part by weight, preferably at least 0.2 part by weight, more preferably at least 0.3 part by weight, and most preferably at least 0.4 part by weight, but generally not more than 0.5 part by weight, preferably not more than 0.45 part by weight, and more preferably not more than 0.42 part by weight. Too much or too little organic peroxide may make it impossible to obtain a suitable hardness distribution and, in turn, a good feel on impact, durability and rebound.

In addition, an antioxidant may be included if necessary. Examples of suitable commercial antioxidants include Nocrac NS-6, Nocrac NS-30 (both available from Ouchi Shinko Chemical Industry Co., Ltd.), and Yoshinox 425 (available from Yoshitomi Pharmaceutical Industries, Ltd.). To achieve a good rebound and durability, it is recommended that the amount of antioxidant included per 100 parts by weight of the base rubber be more than 0 part by weight, preferably at least 0.03 part by weight, and more preferably at least 0.05 part by weight, but not more than 0.2 part by weight, preferably not more than 0.1 part by weight, and more preferably not more than 0.08 part by weight.

To ensure good adhesion between the cover layer and the solid core, and also good durability, it is desirable to treat the surface of the solid core with a primer. Specifically, an adhesive layer may be provided between the solid core and the cover layer in order to enhance the durability of the ball when struck. Examples of adhesives suitable for this purpose include epoxy resin adhesives, vinyl resin adhesives, and rubber adhesives. The use of a urethane resin adhesive or a chlorinated polyolefin adhesive is especially preferred.

The adhesive layer may be formed by dispersion coating. No particular limitation is imposed on the type of emulsion used for dispersion coating. The resin powder used for preparing the emulsion may be a thermoplastic resin powder or a thermoset resin powder. Illustrative examples of suitable resins include vinyl acetate resin, vinyl acetate copolymer resins, ethylene-vinyl acetate (EVA) copolymer resins, acrylate polymer or copolymer resins, epoxy resins, thermoset urethane resins, and thermoplastic urethane resins. Of these, epoxy resins, thermoset urethane resins, thermoplastic urethane resins and acrylate polymer or copolymer resins are preferred. A thermoplastic urethane resin is especially preferred.

The adhesive layer has a thickness of preferably 0.1 to 30 μm, more preferably 0.2 to 25 μm, and especially 0.3 to 20 μm.

The solid core (hot-molded material) can be obtained by vulcanizing and curing the above-described rubber composition by a method similar to that used for known golf ball rubber compositions. Vulcanization can be carried out at, for example, a vulcanization temperature of 100 to 200° C. for a period of 10 to 40 minutes.

The solid core has a deformation, when subjected to loading from an initial load of 10 kgf to a final load of 130 kg, of at least 2.0, preferably at least 2.3 mm, more preferably at least 2.7 mm, and most preferably at least 2.8 mm, but not more than 3.5 mm, preferably not more than 3.4 mm, more preferably not more than 3.3 mm, and most preferably not more than 3.2 mm. If the solid core has too small a deformation, the feel of the ball on impact will worsen and the ball will take on too much spin, particularly on long shots with a club such as a driver that significantly deforms the ball. On the other hand, a solid core that is too soft deadens the feel of the ball when played, compromises the rebound of the ball, resulting in a shorter carry, and gives the ball a poor durability to cracking with repeated impact.

In the invention, the solid core has the hardness distribution shown in the following table.

TABLE 2

| Hardness Distribution in Solid Core | Shore D hardness |
|---|---|
| Center | 35 to 55 |
| Region located 5 to 10 mm from center | 39 to 58 |
| Region located 15 mm from center | 48 to 66 |
| Surface | 50 to 68 |
| Hardness difference between center and surface | 5 to 20 |

The solid core has a center hardness, expressed in Shore D hardness units, of at least 35, preferably at least 37, more preferably at least 39, and most preferably at least 40, but not more than 55, preferably not more than 52, more preferably not more than 49, and most preferably not more than 45. If the Shore D hardness is too low, the golf ball will have a smaller rebound, whereas if it is too high, the feel of the ball on impact will be too hard, in addition to which the spin rate on shots taken with a driver will increase, which may result in a shorter carry.

The solid core has a hardness in the region thereof located 5 to 10 mm from the center, expressed in Shore D hardness units, of at least 39, preferably at least 41, more preferably at least 43, and most preferably at least 44, but not more than 58, preferably not more than 55, even more preferably not more than 52, and most preferably not more than 49. If the Shore D hardness is too low, the rebound of the ball will decrease, whereas if it is too high, the feel on impact will be too hard, in addition to which the spin rate on shots taken with a driver will increase, which may result in a shorter carry.

The hardness difference between any two places in the region of the solid core located 5 to 10 mm from the center, expressed in Shore D hardness units, is preferably 0 or more, more preferably ±0.2 or more, and even more preferably ±0.5 or more, but preferably not more than ±2, more preferably not more than ±1.7, even more preferably not more than ±1.5, and most preferably not more than ±1.2.

The solid core has a hardness in the region thereof located 15 mm from the center, expressed in Shore D hardness units, of at least 48, preferably at least 50, more preferably at least 51, and most preferably at least 52, but not more than 66, preferably not more than 63, even more preferably not more than 60, and most preferably not more than 57. If the Shore D hardness is too low, the rebound of the ball will decrease, whereas if it is too high, the feel on impact will be too hard, the spin rate on shots taken with a driver will increase, and the ball will have a shorter carry.

The solid core has a hardness at the surface, expressed in Shore D hardness units, of at least 50, preferably at least 52, more preferably at least 53, and most preferably at least 54, but not more than 68, preferably not more than 65, even more preferably not more than 62, and most preferably not more than 59. If the Shore D hardness is too low, the rebound of the ball will decrease, whereas if it is too high, the feel on impact will be too hard, in addition to which the spin rate on shots taken with a driver will increase, which may result in a shorter carry.

The hardness difference between the surface and center of the solid core, expressed in Shore D hardness units, is at least 5, preferably at least 8, more preferably at least 11, and most preferably at least 14, but not more than 20, preferably not more than 19, and most preferably not more than 18. At a hardness difference smaller than foregoing range, the spin rate on shots taken with a driver increases and the carry decreases. Conversely, at a hardness difference larger than the above-indicated range, the rebound and durability decrease.

It is recommended that the solid core have a diameter of at least 37.6 mm, preferably at least 38.2 mm, more preferably at least 38.8 mm, and most preferably at least 39.6 mm, but not more than 43.0 mm, preferably not more than 42.0 mm, even more preferably not more than 41.5 mm, and most preferably not more than 41.0 mm.

It is recommended that the solid core have a specific gravity of generally at least 0.9, preferably at least 1.0, and more preferably at least 1.1, but not more than 1.4, preferably not more than 1.3, and even more preferably not more than 1.2.

In the practice of the invention, the cover layer is formed primarily of a thermoplastic or thermoset polyurethane material. By forming a solid golf ball whose cover layer is composed primarily of such a polyurethane material, it is possible to achieve an excellent feel, controllability, cut resistance, scuff resistance and durability to cracking on repeated impact without a loss of rebound. The cover may be composed of a single layer or may have a multilayer construction of two or more layers, in which case it is critical for the outermost layer of the cover to be composed primarily of the thermoplastic or thermoset polyurethane material described here.

The cover layer in this case is exemplified by a cover layer made from a cover stock (C) composed primarily of the following components A and B:
(A) a thermoplastic polyurethane material; and
(B) an isocyanate mixture prepared by dispersing (b-1) an isocyanate compound having as functional groups at least two isocyanate groups per molecule in (b-2) a thermoplastic resin that is substantially non-reactive with isocyanate.

When the cover is formed using the above-described cover stock (C), there can be obtained golf balls having a better feel, controllability, cut resistance, scuff resistance and durability to cracking with repeated impact.

Next, above components A to C are described.
(A) The thermoplastic polyurethane material has a morphology which includes soft segments composed of a high-molecular-weight polyol (polymeric glycol) and hard segments composed of a chain extender and a diisocyanate. Here, the high-molecular-weight polyol used as a starting material may be any that is employed in the art relating to thermoplastic polyurethane materials, without particular limitation. Exemplary high-molecular-weight polyols include polyester polyols and polyether polyols, although polyether polyols are better than polyester polyols for synthesizing thermoplastic polyurethane materials having a high rebound resilience and excellent low-temperature properties. Suitable polyether polyols include polytetramethylene glycol and polypropylene glycol. Polytetramethylene glycol is especially preferred from the standpoint of rebound resilience and low-temperature properties. The high-molecular-weight polyol has an average molecular weight of preferably 1,000 to 5,000. To synthesize a thermoplastic polyurethane material having a high rebound resilience, an average molecular weight of 2,000 to 4,000 is especially preferred.

Preferred chain extenders include those used in the prior art relating to thermoplastic polyurethane materials. Illustrative, non-limiting examples include 1,4-butylene glycol, 1,2-ethylene glycol, 1,3-butanediol, 1,6-hexanediol, and 2,2-dimethyl-1,3-propanediol. These chain extenders have an average molecular weight of preferably 20 to 15,000.

Diisocyanates suitable for use include those employed in the prior art relating to thermoplastic polyurethane materials. Illustrative, non-limiting, examples include aromatic diisocyanates such as 4,4'-diphenylmethane diisocyanate, 2,4-toluene diisocyanate and 2,6-toluene diisocyanate; and aliphatic diisocyanates such as hexamethylene diisocyanate. Depending on the type of isocyanate used, the crosslinking reaction during injection molding may be difficult to control. In the present invention, to ensure stable reactivity with the subsequently described isocyanate mixture (B), it is most preferable to use an aromatic diisocyanate, and specifically 4,4'-diphenylmethane diisocyanate.

A commercial product may be suitably used as the above-described thermoplastic polyurethane material. Illustrative examples include Pandex T-8290, Pandex T-8295 and Pandex T-8260 (all manufactured by DIC Bayer Polymer, Ltd.), and Resamine 2593 and Resamine 2597 (both manufactured by Dainichi Seika Colour & Chemicals Mfg. Co., Ltd.).

The isocyanate mixture (B) is prepared by dispersing (b-1) an isocyanate compound having as functional groups at least two isocyanate groups per molecule in (b-2) a thermoplastic resin that is substantially non-reactive with isocyanate. Above isocyanate compound (b-1) is preferably an isocyanate compound used in the prior art relating to thermoplastic polyurethane materials. Illustrative, non-limiting, examples include aromatic diisocyanates such as 4,4'-diphenylmethane diisocyanate, 2,4-toluene diisocyanate and 2,6-toluene diisocyanate; and aliphatic diisocyanates such as hexamethylene diisocyanate. From the standpoint of reactivity and work safety, the use of 4,4'-diphenylmethane diisocyanate is most preferred.

The thermoplastic resin (b-2) is preferably a resin having a low water absorption and excellent compatibility with thermoplastic polyurethane materials. Illustrative, non-limiting, examples of such resins include polystyrene resins, polyvinyl chloride resins, ABS resins, polycarbonate resins and polyester elastomers (e.g., polyether-ester block copolymers, polyester-ester block copolymers). From the standpoint of rebound resilience and strength, the use of a polyester elastomer, particularly a polyether-ester block copolymer, is especially preferred.

In the isocyanate mixture (B), it is desirable for the relative proportions of the thermoplastic resin and the isocyanate compound, expressed as the weight ratio (b-2):(b-1), to be from 100:5 to 100:100, and especially from 100:10 to 100:40. If the amount of the isocyanate compound (b-1) relative to the thermoplastic resin (b-2) is too low, a greater amount of the isocyanate mixture (B) will have to be added to achieve an amount of addition sufficient for the crosslinking reaction with the thermoplastic polyurethane material (A). As a result, the thermoplastic resin (b-2) will exert a large influence, which will compromise the physical properties of the cover stock (C). On the other hand, if the amount of the isocyanate compound (b-1) relative to the thermoplastic resin (b-2) is too large, the isocyanate compound (b-1) may cause slippage to occur during mixing, making preparation of the isocyanate mixture (B) difficult.

The isocyanate mixture (B) can be obtained by, for example, blending the isocyanate compound (b-1) in the thermoplastic resin (b-2) and thoroughly working together these components at a temperature of 130 to 250° C. using mixing rolls or a Banbury mixer, then either pelletizing or cooling and subsequently grinding. A commercial product such as Crossnate EM30 (made by Dainichi Seika Colour & Chemicals Mfg. Co., Ltd.) may be suitably used as the isocyanate mixture (B).

The cover stock (C) is composed primarily of the above-described thermoplastic polyurethane material (A) and isocyanate mixture (B). The relative proportion of the thermoplastic polyurethane material (A) to the isocyanate mixture (B) in the cover stock (C), expressed as the weight ratio (A):(B), is preferably from 100:1 to 100:100, more preferably from 100:5 to 100:50, and even more preferably from 100:10 to 100:30. If too little isocyanate mixture (B) is included with respect to the thermoplastic polyurethane material (A), a sufficient crosslinking effect will not be achieved. On the other hand, if too much is included, unreacted isocyanate may discolor the molded material.

In addition to the above-described ingredients, other ingredients may be included in the cover stock (C). For example, thermoplastic polymeric materials other than the thermoplastic polyurethane material may be included; illustrative examples include polyester elastomers, polyamide elastomers, ionomer resins, styrene block elastomers, polyethylene and nylon resins. Thermoplastic polymeric materials other than the thermoplastic polyurethane material may be included in an amount of 0 to 100 parts by weight, preferably 10 to 75 parts by weight, and more preferably 10 to 50 parts by weight, per 100 parts by weight of the thermoplastic polyurethane material serving as the essential component. The amount of thermoplastic polymeric materials used is selected as appropriate for such purposes as adjusting the hardness of the cover material, improving the rebound, improving the flow properties, and improving adhesion. If necessary, various additives such as pigments, dispersants, antioxidants, light stabilizers, ultraviolet absorbers and parting agents may also be suitably included in the cover stock (C).

Formation of the cover from the cover stock (C) can be carried out by adding the isocyanate mixture (B) to the thermoplastic polyurethane material (A) and dry mixing, then using an injection molding machine to mold the mixture into a cover over the core. The molding temperature varies with the type of thermoplastic polyurethane material (A), although molding is generally carried out within a temperature range of 150 to 250° C.

Reactions and crosslinking which take place in the golf ball cover thus obtained are believed to involve the reaction of isocyanate groups with hydroxyl groups remaining on the thermoplastic polyurethane material to form urethane bonds, or the formation of an allophanate or biuret crosslinked form via a reaction involving the addition of isocyanate groups to urethane groups in the thermoplastic polyurethane material. Although the crosslinking reaction has not yet proceeded to a sufficient degree immediately after injection molding of the cover stock (C), the crosslinking reaction can be made to proceed further by carrying out an annealing step after molding, in this way conferring the golf ball cover with useful characteristics. "Annealing," as used herein, refers to heat aging the cover at a constant temperature for a given length of time, or aging the cover for a fixed period at room temperature.

The cover has a surface hardness, expressed in Shore D hardness units, of at least 50, preferably at least 53, more preferably at least 56, even more preferably at least 58, and most preferably at least 60, but not more than 70, preferably not more than 68, more preferably not more than 66, and most preferably not more than 65. If the cover is too soft, the ball will have a greater spin receptivity and an inadequate rebound, shortening the distance of travel, in addition to which the cover will have a poor scuff resistance. On the other hand, if the cover is too hard, the durability to cracking with repeated impact will decrease and the feel of the ball during the short game and when hit with a putter will worsen. The Shore D hardness of the cover is the value measured with a type D durometer according to ASTM D2240.

The cover material has a flexural rigidity of at least 50 MPa, preferably at least 60 MPa, and more preferably at least 70 MPa, but not more than 300 MPa, preferably not more than 280 MPa, even more preferably not more than 260 MPa, and most preferably not more than 240 MPa. By giving the cover a flexural rigidity that is low relative to its hardness, there can be obtained a cover stock suitable for good spin characteristics and controllability on approach shots.

To achieve the desired spin properties on shots taken with a driver, the core must have a surface hardness that is lower than the surface hardness of the cover. Specifically, the surface hardness difference between the core and the cover, expressed in Shore D hardness units, is set to at least 1, preferably at least 2, and more preferably at least 5, but not more than 15, preferably not more than 13, and more preferably not more than 11.

The cover has a thickness of at least 0.5 mm, preferably at least 0.8 mm, more preferably at least 1.1 mm, even more preferably at least 1.4 mm, and most preferably at least 1.7 mm, but not more than 2.5 mm, preferably not more than 2.3 mm, more preferably not more than 2.1 mm, and most preferably not more than 2.0 mm. If the cover is too thin, the durability to cracking with repeated impact worsens and the resin has difficulty spreading properly through the top portion of the mold during injection molding, which may result in a poor sphericity. On the other hand, if the cover is too thick, the ball takes on increased spin when hit with a number one wood (W#1), shortening the carry, in addition to which the ball has too hard a feel on impact.

The cover in the inventive golf ball may be composed of a single layer or may be composed of two or more layers. If the cover is composed of two or more layers, it is essential for the hardness of the outside layer and the overall thickness of the cover to fall within the above-specified ranges. The cover may be formed using a suitable known method, such as by injection-molding the cover directly over the core, or by covering the core with two half-cups that have been molded beforehand as hemispherical shells, then molding under applied heat and pressure.

Numerous dimples are formed on the surface of the golf ball (surface of the cover layer). The number of dimples is generally at least 250, preferably at least 270, more preferably at least 290, and most preferably at least 310, but generally not more than 450, preferably not more than 440, more preferably not more than 420, and most preferably not more than 400. In the invention, within this range, the ball undergoes lift and the carry of the ball on shots taken with a driver can be increased. To achieve a suitable trajectory, it is desirable for the dimples to be given a shape that is circular as seen from above. The average dimple diameter is preferably at least 3.5 mm, more preferably at least 3.6 mm, and even more preferably at least 3.8 mm, but preferably not more than 5.0 mm, more preferably not more than 4.7 mm, even more preferably not more than 4.5 mm, and most preferably not more than 4.3 mm. The average dimple depth is preferably at least 0.125 mm, more preferably at least 0.130 mm, even more preferably at least 0.133 mm, and most preferably at least 0.135 mm, but preferably not more than 0.170 mm, more preferably not more than 0.160 mm, even more preferably not more than 0.150 mm, and most preferably not more than 0.148 mm. Moreover, the dimples are composed of preferably at least 4 types, more preferably at least 5 types, and even more preferably at least 6 types, of mutually differing diameter and/or depth. While there is no particular upper limit on the number of dimple types, it is recommended that there be not more than 20 types, preferably not more than 15 types, more preferably not more than 12 types, and most preferably not more than 9 types.

As used herein, "average depth" refers to the mean value for the depths of all the dimples. The diameter of a dimple is measured as the distance across the dimple between positions where the dimple region meets land areas (non-dimple regions), that is, between the highest points of the dimple region. The golf ball is usually painted, in which case the dimple diameter refers to the diameter when the surface of the ball is covered with paint. The depth of a dimple is measured by connecting together the positions where the dimple meets the surrounding land areas so as to define an imaginary plane, and determining the vertical distance from a center position on the plane to the bottom (deepest position) of the dimple.

If necessary, the surface of the solid golf ball can be marked, painted and surface treated.

The solid golf ball of the invention has a deformation, when subjected to loading from an initial load of 10 kgf to a final load of 130 kgf, of at least 2.0 mm, preferably at least 2.2 mm, more preferably at least 2.4 mm, and even more preferably at least 2.5 mm, but not more than 2.9 mm, and preferably not more than 2.8 mm.

The solid golf ball of the invention can be manufactured in accordance with the Rules of Golf for use in competitive play, in which case the ball may be formed to a diameter of not less than 42.67 mm and a weight of not more than 45.93 g. The upper limit for the diameter is generally not more than 44.0 mm, preferably not more than 43.8 mm, more preferably not more than 43.5 mm, and most preferably not more than 43.0 mm. The lower limit for the weight is generally not less than 44.5 g, preferably not less than 45.0 g, more preferably not less than 45.1 g, and even more preferably not less than 45.2 g.

The solid golf ball of the invention can be manufactured using an ordinary process such as a known injection molding process. For example, a molded and vulcanized article composed primarily of the base rubber is placed as the solid core within a specific injection-molding mold, following which the cover stock is injection-molded over the core to give the golf ball. Alternatively, the solid core may be covered with two half-cups that have been molded beforehand as hemispherical shells, then molding carried out under applied heat and pressure.

In the solid golf ball of the invention, by optimizing the hardness distribution of the solid core, selection of the cover material, the hardnesses of the solid core and the cover, and the amount of deflection by the ball as a whole, the rebound is enhanced and the spin rate of the ball on full shots with a driver is reduced, increasing the distance traveled by the ball. Moreover, compared with an ordinary ionomer cover, the cover has a low flexural rigidity that is relatively low for its hardness, resulting in an excellent spin performance on approach shots and a very high stability. In addition, the inventive golf ball also has an excellent scuff resistance and excellent durability to cracking on repeated impact, making it overall a highly advantageous ball for use in competitive play.

EXAMPLES

The following Examples of the invention and Comparative Examples are provided by way of illustration and not by way of limitation.

Examples 1 to 10, Comparative Examples 1 to 8

In each example, a solid core was manufactured by preparing a core composition having one of formulations No. 1 to 11 shown in Table 3, then molding and vulcanizing the composition under the vulcanization conditions in Table 3. Next, a single-layer cover was formed by injection molding about the core one of the formulations A to E shown in Table 4, thereby encasing the solid core within a cover. In addition, a plurality of dimple types were used in combination, giving a two-piece solid golf ball having 330 dimples (configuration I), 432 dimples (configuration II) or 500 dimples (configuration III).

TABLE 3

| | | No. 1 | No. 2 | No. 3 | No. 4 | No. 5 | No. 6 | No. 7 | No. 8 | No. 9 | No. 10 | No. 11 |
|---|---|---|---|---|---|---|---|---|---|---|---|---|
| Core formulations | BR11 | | | | | | | | | | | 100 |
| | BR730 | 100 | 100 | 100 | 100 | 100 | 100 | 100 | 100 | 100 | 100 | |
| | Perhexa C-40 | 0.3 | 0.3 | 0.3 | 0.3 | 0.3 | 0.3 | 0.3 | 1 | 0.3 | 0.3 | 0.6 |
| | (true amount of addition) | 0.12 | 0.12 | 0.12 | 0.12 | 0.12 | 0.12 | 0.12 | 0.4 | 0.12 | 0.12 | 0.24 |
| | Percumyl D | 0.3 | 0.3 | 0.3 | 0.3 | 0.3 | 0.3 | 0.3 | | 0.3 | 0.3 | 0.6 |
| | Zinc oxide | 10.6 | 11.3 | 9.1 | 9.4 | 10.4 | 5.2 | 14.1 | 10.6 | 21.3 | 8.7 | 11.2 |

TABLE 3-continued

|  |  |  | No. 1 | No. 2 | No. 3 | No. 4 | No. 5 | No. 6 | No. 7 | No. 8 | No. 9 | No. 10 | No. 11 |
|---|---|---|---|---|---|---|---|---|---|---|---|---|---|
|  | Antioxidant |  | 0.1 | 0.1 | 0.1 | 0.1 | 0.1 | 0.1 | 0.1 | 0.1 | 0.1 | 0.1 | 0.1 |
|  | Zinc stearate |  | 5 | 5 | 5 | 5 | 5 | 0 | 5 | 5 | 5 | 5 | 5 |
|  | Zinc acrylate |  | 37 | 32 | 38 | 37 | 34 | 46 | 28 | 34 | 30 | 39 | 32 |
|  | Zinc salt of pentachlorothiophenol |  | 0.4 | 1 | 0.4 | 0.6 | 1 | 0 | 1 | 1 | 1 | 0.2 | 1 |
| Vulcanization conditions | Primary vulcanization | Temp. (° C.) | 160 | 160 | 160 | 160 | 160 | 160 | 160 | 135 | 160 | 160 | 160 |
|  |  | Time (min) | 13 | 13 | 13 | 13 | 13 | 13 | 13 | 40 | 13 | 13 | 13 |
|  | Secondary vulcanization | Temp. (° C.) |  |  |  |  |  |  |  | 170 |  |  |  |
|  |  | Time (min) |  |  |  |  |  |  |  | 5 |  |  |  |

Numbers in the "Core formulations" portion of the table indicate parts by weight.

Trade names for most of the materials appearing in the table are as follows.

BR11: A polybutadiene rubber produced by JSR Corporation using a nickel catalyst; cis-1,4 bond content, 96%; 1,2-vinyl bond content, 2.0%; Mooney viscosity, 43; Mw/Mn=4.1.

BR730: A polybutadiene rubber produced by JSR Corporation using a neodymium catalyst; cis-1,4 bond content, 96%; 1,2-vinyl bond content, 1.3%; Mooney viscosity, 55; Mw/Mn=3.

Perhexa C-40: 1,1-Bis(t-butylperoxy)cyclohexane, 40% dilution; produced by NOF Corporation. Because Perhexa C-40 is a 40% dilution, the true amount of addition is also indicated in the above table.

Percumyl D: Dicumyl peroxide, produced by NOF Corporation.

Zinc oxide: Produced by Sakai Chemical Industry Co., Ltd.

Antioxidant: 2,2'-Methylenebis(4-methyl-6-t-butylphenol), produced as Nocrac NS-6 by Ouchi Shinko Chemical Industry Co.

Zinc acrylate: Produced by Nihon Jyoryu Kogyo Co., Ltd.

Zinc stearate: Produced by NOF Corporation

TABLE 4

|  | A | B | C | D | E |
|---|---|---|---|---|---|
| Himilan 1605 |  |  |  | 50 |  |
| Himilan 1706 |  |  |  | 50 |  |
| Himilan 1601 |  |  |  |  | 50 |
| Himilan 1557 |  |  |  |  | 50 |
| Pandex T8260 | 50 | 100 |  |  |  |
| Pandex T8295 | 50 |  | 75 |  |  |
| Pandex T8290 |  |  | 25 |  |  |
| Titanium dioxide | 4 | 4 | 4 | 4.8 | 4.8 |
| Polyethylene wax | 1.5 | 1.5 | 1.5 | 2 | 2 |
| Isocyanate compound | 20 | 20 | 20 |  |  |

Trade names for most of the materials appearing in the table are as follows.

Himilan series: Ionomer resins produced by DuPont-Mitsui Polychemicals Co., Ltd.

Pandex series: Thermoplastic polyurethane elastomers produced by Dainippon Ink & Chemicals, Inc.

Isocyanate compound: The isocyanate compound produced by Dainichi Seika Colour & Chemicals Mfg. Co., Ltd. under the trade name Crossnate EM30.

The golf balls obtained in above Examples 1 to 10 and Comparative Examples 1 to 8 were each evaluated for ball deflection, ball properties, flight performance, spin rate on approach shots, and feel when hit. The results are shown in Tables 5 and 6.

Hardness Distribution of Solid Core (Shore D Hardness)

The balls were temperature conditioned at 23° C., then both of the following hardnesses were measured in terms of the Shore D hardness (using a type D durometer in accordance with ASTM-2240).

Each surface hardness shown in the table was obtained by measuring the hardness at any two randomly chosen points on the surface of each of five cores, and determining the average of the measured values.

Each center hardness shown in the table was obtained by cutting the solid core into two halves with a fine cutter, measuring the hardness at the center of the sectioned plane on the two hemispheres for each of five cores, and determining the average of the measured values.

Each cross-sectional hardness shown in the table was obtained by cutting the solid core into two halves, measuring the hardness at the appropriate region of the sectioned plane on the two hemispheres for each of five cores, and determining the average of the measured values.

Surface Hardness of Cover

The balls were temperature conditioned at 23° C., following which the hardness at two randomly chosen points in undimpled land areas on the surface of each of five balls were measured. Measurements were conducted with a type D durometer in accordance with ASTM-2240.

Deflection of Solid Core and Finished Ball

Using an Instron model 4204 test system manufactured by Instron Corporation, solid cores and finished balls were each compressed at a rate of 10 mm/min, and the difference between deformation at 10 kg and deformation at 130 kg was measured.

Initial Velocity

The initial velocity was measured using an initial velocity measuring apparatus of the same type as the USGA drum rotation-type initial velocity instrument approved by the R&A. The ball was temperature conditioned at 23±1° C. for at least 3 hours, then tested in a chamber at a room temperature of 23±2° C. The ball was hit using a 250-pound (113.4 kg) head (striking mass) at an impact velocity of 143.8 ft/s (43.83 m/s). One dozen balls were each hit four times. The time taken to traverse a distance of 6.28 ft (1.91 m) was measured and used to compute the initial velocity of the ball. This cycle was carried out over a period of about 15 minutes.

Distance

The total distance traveled by the ball when hit at a head speed (HS) of 45 m/s with a driver (Tour Stage X-DRIVE TYPE 350 PROSPEC, manufactured by Bridgestone Sports Co., Ltd.; loft angle, 8°) mounted on a swing robot (Miyamae Co., Ltd.) was measured. The spin rate was measured from high-speed camera images of the ball taken immediately after impact.

Spin Rate on Approach Shots

The spin rate of a ball hit at a head speed of 20 m/s with a sand wedge (abbreviated below as "SW"; Tour Stage X-wedge, manufactured by Bridgestone Sports Co., Ltd.; loft angle, 58°) was measured. The spin rate was measured by the same method as that used above when measuring distance.

Feel

The feel of each ball when teed up and hit with a driver and when hit with a putter was evaluated by ten amateur golfers, and was rated as indicated below based on the number of golfers who responded that the ball had a "soft" feel. An X-DRIVE TYPE 350 PROSPEC having a loft angle of 10° was used as the driver, and a Tour Stage ViQ Model-III was used as the putter. Both clubs are manufactured by Bridgestone Sports Co., Ltd.

Poor: 1 to 3 golfers rated the ball as "soft."
Ordinary: 4 to 6 golfers rated the ball as "soft."
Good: 7 to 10 golfers rated the ball as "soft."

Scuff Resistance

Each ball was temperature conditioned at 23° C., and hit at a head speed of 33 m/s with a square grooved pitching wedge mounted on a swing robot. The condition of the ball after being hit was rated visually by three judges according to the following criteria. Results shown in the table are the average point values obtained for each ball.

10 points: No visible defects.
8 points: Substantially no defects.
5 points: Some defects noted, but ball can be re-used.
3 points: Condition is borderline, but ball can be re-used.
1 point: Unfit for reuse.

TABLE 5

| | | | Example | | | | |
|---|---|---|---|---|---|---|---|
| | | | 1 | 2 | 3 | 4 | 5 |
| Solid core | Type | | No. 1 | No. 2 | No. 3 | No. 4 | No. 5 |
| | Diameter (mm) | | 41.0 | 38.0 | 38.9 | 38.9 | 38.9 |
| | Deflection (mm) | | 2.8 | 3.4 | 2.6 | 2.8 | 3.2 |
| | Hardness distribution (Shore D) | Center hardness | 41 | 39 | 48 | 46 | 41 |
| | | Region 5 mm from center | 47 | 44 | 54 | 52 | 47 |
| | | Region 10 mm from center | 48 | 46 | 56 | 53 | 48 |
| | | Region 15 mm from center | 54 | 52 | 61 | 58 | 54 |
| | | Surface | 57 | 55 | 66 | 63 | 57 |
| | | Hardness difference between center and surface | 16 | 16 | 18 | 17 | 16 |
| Cover (single layer) | Type | | A | A | B | A | A |
| | Surface hardness (Shore D) | | 64 | 64 | 67 | 64 | 64 |
| | Flexural rigidity (kgf/cm$^2$) | | 181 | 181 | 287 | 181 | 181 |
| | Hardness difference between cover surface and core surface (Shore D) | | 7 | 9 | 1 | 1 | 7 |
| Finished ball | Deflection (mm) | | 2.6 | 2.8 | 2.2 | 2.4 | 2.7 |
| | Diameter (mm) | | 42.7 | 42.7 | 42.7 | 42.7 | 42.7 |
| | Weight (g) | | 45.4 | 45.5 | 45.4 | 45.4 | 45.4 |
| | Specific gravity | | 1.16 | 1.16 | 1.16 | 1.16 | 1.16 |
| | Thickness (mm) | | 0.8 | 2.3 | 1.9 | 1.9 | 1.9 |
| Dimples | Number of dimples | | 330 | 432 | 432 | 330 | 330 |
| | Average dimple depth (mm) | | 0.146 | 0.142 | 0.142 | 0.146 | 0.146 |
| | Average dimple diameter (mm) | | 4.2 | 3.6 | 3.6 | 4.2 | 4.2 |
| | Number of dimple types | | 6 | 5 | 5 | 6 | 6 |
| Distance | Spin rate (rpm) | | 2730 | 2650 | 2890 | 2820 | 2690 |
| | Total distance (m) | | 236.0 | 230.0 | 235.5 | 236.5 | 235.0 |
| Spin on approach shots (rpm) | | | 6370 | 6080 | 6030 | 6420 | 6180 |
| Initial velocity (m/s) | | | 77.6 | 77.0 | 77.6 | 77.6 | 77.5 |
| Scuff resistance | | | 5.0 | 5.5 | 3.5 | 4.5 | 5.5 |
| Feel on impact | | Driver | Good | Good | Ordinary | Good | Good |
| | | Putter | Good | Good | Ordinary | Good | Good |

| | | | Example | | | | |
|---|---|---|---|---|---|---|---|
| | | | 6 | 7 | 8 | 9 | 10 |
| Solid core | Type | | No. 2 | No. 5 | No. 5 | No. 5 | No. 2 |
| | Diameter (mm) | | 38.9 | 38.9 | 38.9 | 38.9 | 38.9 |
| | Deflection (mm) | | 3.4 | 3.2 | 3.2 | 3.2 | 3.4 |
| | Hardness distribution (Shore D) | Center hardness | 39 | 41 | 41 | 41 | 39 |
| | | Region 5 mm from center | 44 | 47 | 47 | 47 | 44 |
| | | Region 10 mm from center | 46 | 48 | 50 | 48 | 46 |
| | | Region 15 mm from center | 52 | 54 | 53 | 54 | 52 |
| | | Surface | 55 | 57 | 57 | 57 | 55 |
| | | Hardness difference between center and surface | 16 | 16 | 16 | 16 | 16 |

TABLE 5-continued

| | | | | | | |
|---|---|---|---|---|---|---|
| Cover (single layer) | Type | A | C | A | A | A |
| | Surface hardness (Shore D) | 64 | 59 | 64 | 64 | 64 |
| | Flexural rigidity (kgf/cm$^2$) | 181 | 88 | 181 | 181 | 181 |
| | Hardness difference between cover surface and core surface (Shore D) | 9 | 2 | 7 | 7 | 9 |
| Finished ball | Deflection (mm) | 2.9 | 2.8 | 2.7 | 2.7 | 2.9 |
| | Diameter (mm) | 42.7 | 42.7 | 42.7 | 42.7 | 42.7 |
| | Weight (g) | 45.4 | 45.4 | 45.4 | 45.4 | 45.4 |
| | Specific gravity | 1.16 | 1.16 | 1.16 | 1.16 | 1.16 |
| | Thickness (mm) | 1.9 | 1.9 | 1.9 | 1.9 | 1.9 |
| Dimples | Number of dimples | 330 | 330 | 330 | 432 | 432 |
| | Average dimple depth (mm) | 0.146 | 0.146 | 0.146 | 0.142 | 0.142 |
| | Average dimple diameter (mm) | 4.2 | 4.2 | 4.2 | 3.6 | 3.6 |
| | Number of dimple types | 6 | 6 | 6 | 5 | 5 |
| Distance | Spin rate (rpm) | 2600 | 2760 | 2660 | 2700 | 2590 |
| | Total distance (m) | 233.0 | 234.5 | 235.5 | 233.0 | 231.0 |
| Spin on approach shots (rpm) | | 5960 | 6660 | 6150 | 6170 | 5970 |
| Initial velocity (m/s) | | 77.3 | 77.5 | 77.3 | 77.5 | 77.3 |
| Scuff resistance | | 6.0 | 7.0 | 5.5 | 5.5 | 6.0 |
| Feel on impact | Driver | Good | Good | Good | Good | Good |
| | Putter | Good | Good | Good | Good | Good |

TABLE 6

| | | Comparative Example | | | | | | | |
|---|---|---|---|---|---|---|---|---|---|
| | | 1 | 2 | 3 | 4 | 5 | 6 | 7 | 8 |
| Solid core | Type | No. 6 | No. 7 | No. 8 | No. 5 | No. 9 | No. 10 | No. 11 | No. 9 |
| | Diameter (mm) | 38.9 | 40.3 | 38.9 | 37.5 | 38.9 | 38.9 | 38.9 | 38.9 |
| | Deflection (mm) | 1.9 | 3.8 | 2.8 | 3.2 | 3.4 | 2.4 | 3.2 | 3.4 |
| | Hardness distribution (Shore D) Center hardness | 56 | 35 | 55 | 41 | 39 | 50 | 41 | 39 |
| | Region 5 mm from center | 62 | 40 | 56 | 47 | 44 | 56 | 47 | 44 |
| | Region 10 mm from center | 63 | 42 | 57 | 48 | 46 | 58 | 48 | 46 |
| | Region 15 mm from center | 68 | 45 | 57 | 54 | 52 | 63 | 54 | 52 |
| | Surface | 74 | 49 | 58 | 57 | 55 | 68 | 57 | 55 |
| | Hardness difference between center and surface | 18 | 14 | 3 | 16 | 16 | 18 | 16 | 16 |
| Cover (single layer) | Type | A | A | A | A | D | A | A | E |
| | Surface hardness (Shore D) | 64 | 64 | 64 | 64 | 72 | 64 | 64 | 64 |
| | Flexural rigidity (kgf/cm$^2$) | 181 | 181 | 181 | 181 | 400 | 181 | 181 | 200 |
| | Hardness difference between cover surface and core surface (Shore D) | −10 | 15 | 6 | 7 | 17 | −4 | 7 | 9 |
| Finished ball | Deflection (mm) | 1.7 | 3.6 | 2.4 | 2.3 | 2.2 | 2.0 | 2.7 | 2.8 |
| | Diameter (mm) | 42.7 | 42.7 | 42.7 | 42.7 | 42.7 | 42.7 | 42.7 | 42.7 |
| | Weight (g) | 45.4 | 45.5 | 45.4 | 45.6 | 45.4 | 45.4 | 45.4 | 45.4 |
| | Specific gravity | 1.16 | 1.16 | 1.16 | 1.16 | 0.99 | 1.16 | 1.16 | 0.99 |
| | Thickness (mm) | 1.9 | 1.2 | 1.9 | 2.6 | 1.9 | 1.9 | 1.9 | 1.9 |
| Dimples | Number of dimples | 330 | 330 | 330 | 330 | 330 | 500 | 330 | 330 |
| | Average dimple depth (mm) | 0.142 | 0.142 | 0.142 | 0.142 | 0.142 | 0.153 | 0.142 | 0.142 |
| | Average dimple diameter (mm) | 4.2 | 4.2 | 4.2 | 4.2 | 4.2 | 3.1 | 4.2 | 4.2 |
| | Number of dimple types | 6 | 6 | 6 | 6 | 6 | 3 | 6 | 6 |
| Distance | Spin rate (rpm) | 3170 | 2460 | 3120 | 2610 | 2460 | 3070 | 2690 | 2590 |
| | Total distance (m) | 229.5 | 229.0 | 228.0 | 229.0 | 234.5 | 227.5 | 229.5 | 227.5 |
| Spin on approach shots (rpm) | | 6780 | 5790 | 6510 | 5820 | 4190 | 6120 | 6170 | 5820 |
| Initial velocity (m/s) | | 77.6 | 76.9 | 77.3 | 76.8 | 77.3 | 77.4 | 76.9 | 76.6 |
| Scuff resistance | | 2.0 | 7.0 | 5.5 | 5.0 | 6.0 | 2.5 | 5.5 | 2.0 |
| Feel on impact | Driver | Poor | Good | Ordinary | Poor | Good | Ordinary | Good | Good |
| | Putter | Ordinary | Good | Good | Good | Poor | Ordinary | Good | Good |

The results in Tables 5 and 6 show that, in Comparative Example 1, the finished ball had a hardness that was too high, resulting in a hard feel when hit, and also resulting in an excessive spin rate which shortened the distance traveled by the ball. In Comparative Example 2, the finished ball had a hardness that was too low, reducing the rebound and shortening the carry, and also lowering the performance of the ball on approach shots. In Comparative Example 3, the core lacked much of a hardness distribution, resulting in a high spin rate, a shorter carry and a lower rebound. In Comparative Example 4, the cover was too thick, as a result of which a good rebound was not obtained, shortening the distance traveled by the ball. In Comparative Example 5, the cover was made of a hard ionomer, resulting in a very poor controllability on approach shots (spin rate) and a poor feel on shots taken with a putter. In Comparative Example 6, the cover was softer than the surface of the core, resulting in an excessive spin rate and a shorter distance. In Comparative Example 7, the use of a polybutadiene rubber synthesized with a nickel catalyst as the core material resulted in a lower rebound and a shorter distance. In Comparative Example 8, a soft ionomer cover was used, resulting in a lower rebound, a shorter distance, and a poor scuff resistance.

The invention claimed is:

1. A solid golf ball, comprising a solid core, a cover layer that encloses the core, and a plurality of dimples formed on an outside surface of an outermost layer of the cover, wherein the solid core is formed of a rubber composition composed of 100 parts by weight of a base rubber that includes 60 to 100 parts by weight of a polybutadiene rubber having a cis-1,4 bond content of at least 60% and synthesized using a rare-earth catalyst, 0.1 to 5 parts by weight of an organosulfur compound, and an unsaturated carboxylic acid or a metal salt thereof, an organic peroxide and an inorganic filler;

the solid core has a deformation, when subjected to loading from an initial load of 10 kgf to a final load of 130 kg, of 2.0 to 3.5 mm, and has the hardness distribution shown in the table below;

the cover layer is formed primarily of a thermoplastic or thermoset polyurethane material and has a thickness of 0.5 to 2.5 mm, a Shore D hardness at the surface of 50 to 70 and a flexural rigidity of 50 to 300 MPa;

the surface hardness of the core is from 1 to 15 Shore D hardness units lower than the surface hardness of the cover; and the golf ball has a deformation, when subjected to loading from an initial load of 10 kgf to a final load of 130 kgf, of 2.0 to 2.9 mm

| Hardness Distribution in Solid Core | Shore D hardness |
| --- | --- |
| Center | 35 to 55 |
| Region located 5 to 10 mm from center | 39 to 58 |
| Region located 15 mm from center | 48 to 66 |
| Surface | 50 to 68 |
| Hardness difference between center and surface | 5 to 20 | and wherein the solid golf ball has a hardness difference between any two places in the region of the solid core located 5 to 10 mm from the core center of not more than ±2 Shore D hardness units.

2. The solid golf ball of claim 1, wherein the solid core has a diameter of 37.6 to 43.0 mm and the golf ball has a diameter of 42.67 to 44.0 mm.

3. The solid golf ball of claim 1, wherein the solid core contains, per 100 parts by weight of the base rubber: 30 to 45 parts by weight of the unsaturated carboxylic acid or a metal salt thereof, 0.1 to 0.5 part by weight of the organic peroxide, 5 to 80 parts by weight of the inorganic filler, and 0 to 0.2 part by weight of an antioxidant.

4. The solid golf ball of claim 1, wherein the dimples total in number from 250 to 450, have an average depth of 0.125 to 0.170 mm and an average diameter of 3.5 to 5.0 mm for all dimples, and are configured from at least four dimple types.

5. A solid golf ball, comprising a solid core, a cover layer that encloses the core, and a plurality of dimples formed on an outside surface of an outermost layer of the cover, wherein the solid core is formed of a rubber composition composed of 100 parts by weight of a base rubber that includes 60 to 100 parts by weight of a polybutadiene rubber having a cis-1,4 bond content of at least 60% and synthesized using a rare-earth catalyst, 0.1 to 5 parts by weight of an organosulfur compound, and an unsaturated carboxylic acid or a metal salt thereof, an organic peroxide and an inorganic filler;

the solid core has a deformation, when subjected to loading from an initial load of 10 kgf to a final load of 130 kg, of 2.0 to 3.5 mm, and has the hardness distribution shown in the table below;

the cover layer is formed primarily of a thermoplastic or thermoset polyurethane material and has a thickness of 0.5 to 2.5 mm, a Shore D hardness at the surface of 50 to 70 and a flexural rigidity of 50 to 300 MPa;

the surface hardness of the core is from 1 to 15 Shore D hardness units lower than the surface hardness of the cover; and the golf ball has a deformation, when subjected to loading from an initial load of 10 kgf to a final load of 130 kgf, of 2.0 to 2.9 mm

| Hardness Distribution in Solid Core | Shore D hardness |
| --- | --- |
| Center | 35 to 55 |
| Region located 5 to 10 mm from center | 39 to 58 |
| Region located 15 mm from center | 48 to 66 |
| Surface | 50 to 68 |
| Hardness difference between center and surface | 5 to 20 | and wherein the dimples total in number from 250 to 450, have an average depth of 0.125 to 0.170 mm and an average diameter of 3.5 to 5.0 mm for all dimples, and are configured from at least four dimple types.

6. The solid golf ball of claim 5, wherein the solid core has a diameter of 37.6 to 43.0 mm and the golf ball has a diameter of 42.67 to 44.0 mm.

7. The solid golf ball of claim 5, wherein the solid core contains, per 100 parts by weight of the base rubber: 30 to 45 parts by weight of the unsaturated carboxylic acid or a metal salt thereof, 0.1 to 0.5 part by weight of the organic peroxide, 5 to 80 parts by weight of the inorganic filler, and 0 to 0.2 part by weight of an antioxidant.

* * * * *